UNITED STATES PATENT OFFICE.

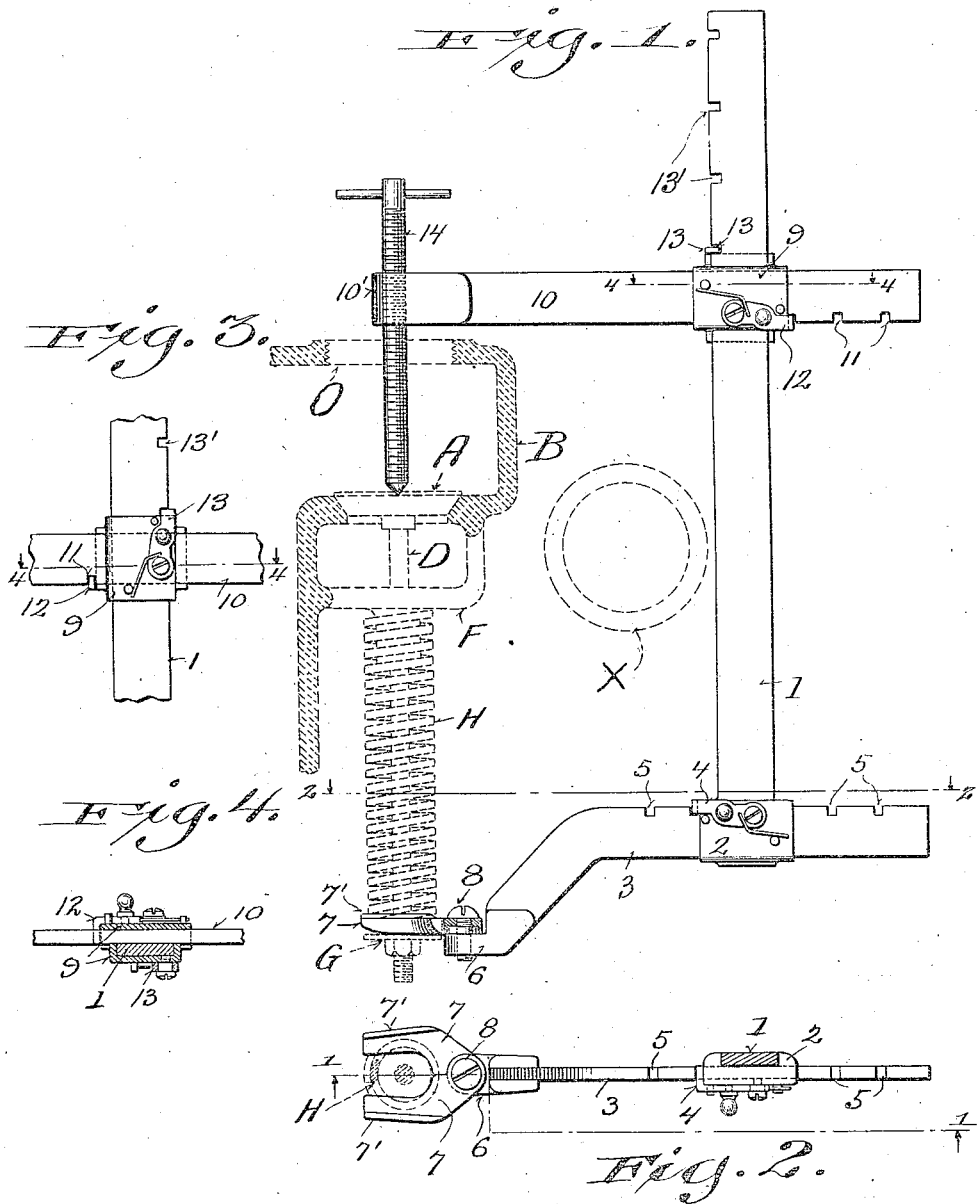

JOHN F. HAUSSMANN, OF MILWAUKEE, WISCONSIN.

TOOL FOR HANDLING COMPRESSED COILED SPRINGS.

1,077,606.  Specification of Letters Patent.  Patented Nov. 4, 1913.

Application filed January 13, 1913. Serial No. 741,661.

*To all whom it may concern:*

Be it known that I, JOHN F. HAUSSMANN, a citizen of the United States, and resident of Milwaukee, in the county of Milwaukee and State of Wisconsin, have invented certain new and useful Improvements in Tools for Handling Compressed Coiled Springs; and I do hereby declare that the following is a full, clear, and exact description thereof.

My invention has for its object to provide a simple, economical and effective tool for handling compressed coiled springs, the same being particularly applicable to the assemblage or dismantling of spring-controlled valves for internal combustion engines.

A further object of the invention is to provide means for adjusting the tool for accommodating various dimensions of assembled valve mechanisms, the adjustment being also provided for accommodating the contour of engine mechanism, whereby the valves are accessible for assemblage or disorganization.

With the above and other minor objects in view the invention consists in certain peculiarities of construction and combination of parts as set forth hereinafter with reference to the accompanying drawings and subsequently claimed.

In the drawings Figure 1 represents an elevation of a tool embodying the features of my invention, with parts in section as indicated by line 1—1 of Fig. 2, the tool being shown in its working position with relation to a valve mechanism, which valve mechanism is illustrated in dotted lines; Fig. 2, a detailed sectional plan view of the same, the section being indicated upon line 2—2 of Fig. 1; Fig. 3, a detailed side elevation of a portion of the tool showing a block connection between the reach-bar and one arm of said tool looking from the reverse side from that shown in Fig. 1, and Fig. 4, a detailed cross-sectional view of the said arm and reach-bar connection, the section being illustrated by lines 4—4 of Figs. 1 and 3.

Referring by characters to the drawings, 1 represents a flat reach-bar one end of which is provided with a fixed slotted head 2 for the reception of an arm 3 that is transversely adjustable relative to said reach. The arm is locked in its adjusted position by means of a spring controlled dog 4, the nose of which is adapted to engage any one of a series of notched seats 5 that are formed in one edge of the arm. The outer end of said arm 3 terminates with a pad 6 that serves as a seat for the lapped shanks of a pair of spanner fingers 7, the same being hinged to said pad seat by a bolt 8 that is secured thereto. The spanner fingers are preferably formed slightly wedge-shaped with upturned flanges 7′, whereby they may be inserted between the last coil of a spring and its retaining cap. The reach-bar is also provided with a longitudinally slidable arm-carrying block 9 that is transversely slotted for the reception of a second arm 10, which arm is disposed parallel with relation to the first mentioned arm. The second arm also carries a series of notched seats 11 for locking engagement with a spring-controlled dog 12 that is mounted upon the block 9. The slidable block 9 also carries a second spring-controlled dog 13, as best shown in Fig. 3, which dog engages notched seats 13′ in the edge of the reach-bar, whereby the block, together with its arm is adjusted upon the reach-bar and locked with relation to its distance from the spanner-carrying arm 3.

The second arm 10 terminates at one end with an apertured hub 10′ that is internally threaded for engagement with a jack-screw or spindle 14 having a hand-crank at its end, whereby said jack-screw is manipulated, the opposite end of the same being tapered for engagement with a valve member A, as indicated by dotted lines in Fig. 1. The valve-member A, as indicated in dotted lines, is provided with a valve-seat, which seat is formed in a portion of an engine shell B and directly alined with the valve-seat is a threaded aperture O from which the usual cap-closure has been removed as shown. A stem D of the valve A is shown as being guided in a spider F and also as having a cap G that is in threaded engagement with its end. Interposing the cap and spider is the usual coiled spring H, whereby the valve member is held closed.

In Fig. 1 of the drawings the tool is illustrated in position for dismantling the spring-controlled valve, in which position the spanner fingers have been inserted between the last coil of the spring and the cap G. Thereafter the spindle or jack-screw 14 is given the required number of turns and, owing to the fact that its tapered end is in engagement with the face of the valve, the said movement of the jack-screw will cause the coiled spring to be compressed to any extent required in order that the cap G may be removed. Thereafter the valve mechanism can be readily dismantled in the usual manner.

Under ordinary conditions, in standard engines of the internal combustion type, pipes or other obstructions, such as indicated at X in Fig. 1, may prevent access of a tool to the valve mechanism and under such conditions it is apparent that both the spanner arm and jack-screw arm in my improved tool can be adjusted transversely of the reach, whereby said reach will not contact with the protruding engine member, it being understood that the notches of the respective arms are in such relation that when said arms are adjusted in or out and locked that the spanner and jack-screw will be in axial alinement.

To provide for lateral quick adjustment between the engaging end of the jack-screw and spanner fingers for variations in dimensions the head 9 as previously described is adjustable longitudinally of the reach-bar. Hence the jack-screw carrying arm may be quickly moved to predetermined distances with relation to the spanner fingers and thereafter the said spindle is operated to effect a spring compression. Thus the tool can also readily be quickly adjusted to a valve before the jack-screw 14 is put into operation.

I claim:

A tool for handling compressed coiled springs comprising a reach-bar, a block in slidable union with the reach-bar, a transversely disposed arm in slidable union with the block, means for adjustably locking the block to the reach-bar, means for adjustably locking the arm to said block, a second transversely disposed arm extending from the reach-bar, a spanner carried by one of the arms, and a jack-screw carried by the opposite arm.

In testimony that I claim the foregoing I have hereunto set my hand at Milwaukee in the county of Milwaukee and State of Wisconsin in the presence of two witnesses.

JOHN F. HAUSSMANN.

Witnesses:
GEO. W. YOUNG,
M. E. DOWNEY.